United States Patent
Lin et al.

(10) Patent No.: US 10,657,075 B2
(45) Date of Patent: May 19, 2020

(54) KEYBOARD-VIDEO-MOUSE SWITCH, AND SIGNAL TRANSMITTING METHOD

(71) Applicant: I/O INTERCONNECT, LTD., Santa Ana, CA (US)

(72) Inventors: Kun-Yuan Lin, Taipei (TW); Tsung-Min Chen, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 43 days.

(21) Appl. No.: 15/907,434

(22) Filed: Feb. 28, 2018

(65) Prior Publication Data

US 2018/0189197 A1 Jul. 5, 2018

Related U.S. Application Data

(63) Continuation-in-part of application No. 15/726,794, filed on Oct. 6, 2017, now Pat. No. 10,467,169.

(Continued)

(51) Int. Cl.
    *G06F 13/10* (2006.01)
    *G06F 9/455* (2018.01)
    *G06F 13/40* (2006.01)

(52) U.S. Cl.
    CPC ........ *G06F 13/105* (2013.01); *G06F 9/45504* (2013.01); *G06F 13/4022* (2013.01); *G09G 2370/24* (2013.01)

(58) Field of Classification Search
None
See application file for complete search history.

(56) References Cited

U.S. PATENT DOCUMENTS 6,160,544 A * 12/2000 Hayashi ................. H04H 40/18
    348/E5.022
6,324,605 B1 * 11/2001 Rafferty .............. G06F 13/4022
    710/100

(Continued)

FOREIGN PATENT DOCUMENTS

CN     201966949 U     9/2011
EP     2306360 A1 *     4/2011     ............. G06F 3/023

(Continued)

OTHER PUBLICATIONS

'The Ultimate Secure KVM Solution' copyright 2014 by High Sec Labs, Ltd. (Year: 2014).*

(Continued)

*Primary Examiner* — Steven G Snyder
(74) *Attorney, Agent, or Firm* — Locke Lord LLP; Tim Tingkang Xia, Esq.

(57) ABSTRACT

A KVM switch is disclosed. The KVM switch, for connecting between computers and at least one peripheral device, the KVM switch includes a first interface, second interfaces, a controller and device emulators. The controller is configured to receive a peripheral signal and generate a first serial signal and a second serial signal. Each of the device emulators is configured to receive the first serial signal with the a target address and the second serial signal with a second target address, and each of the device emulators is guided by unique address to one of the computers, respectively, wherein, when the device emulators receive the first serial signal and the second serial signal, the device emulators are configured to determine whether to process the first serial signal and the second serial signal by comparing the first target address and the second target address with the unique address.

11 Claims, 4 Drawing Sheets

Related U.S. Application Data

(60) Provisional application No. 62/429,167, filed on Dec. 2, 2016, provisional application No. 62/406,498, filed on Oct. 11, 2016.

(56) References Cited

U.S. PATENT DOCUMENTS

| | | | |
|---|---|---|---|
| 6,549,966 B1 | 4/2003 | Dickens et al. | |
| 6,557,170 B1 | 4/2003 | Wilder et al. | |
| 6,618,774 B1 | 9/2003 | Dickens et al. | |
| 6,671,756 B1* | 12/2003 | Thomas | G06F 3/023 710/220 |
| 6,681,250 B1* | 1/2004 | Thomas | G06F 3/023 709/203 |
| 7,613,854 B2* | 11/2009 | Chen | G06F 3/023 703/24 |
| 7,689,724 B1 | 3/2010 | Hatton et al. | |
| 7,752,339 B2* | 7/2010 | Sim | G09G 5/006 710/4 |
| 7,873,764 B2 | 1/2011 | Bica | |
| 7,945,703 B2* | 5/2011 | Sim | G09G 5/006 710/4 |
| 8,103,808 B2* | 1/2012 | Lin | G06F 3/14 345/156 |
| 8,589,141 B2* | 11/2013 | Lien | G06F 3/038 703/23 |
| 8,769,172 B2 | 7/2014 | Soffer et al. | |
| 8,869,308 B2 | 10/2014 | Soffer | |
| 9,411,766 B2 | 8/2016 | Soffer | |
| 9,501,157 B2* | 11/2016 | Soffer | G06F 3/023 |
| 9,524,140 B2* | 12/2016 | Leibow | G06F 3/1454 |
| 9,542,006 B2 | 1/2017 | Soffer | |
| 9,626,323 B2* | 4/2017 | Huang | G06F 3/0227 |
| 9,665,525 B2 | 5/2017 | Soffer | |
| 9,767,049 B2 | 9/2017 | Soffer et al. | |
| 2004/0015615 A1* | 1/2004 | Liu | G06F 3/023 710/1 |
| 2005/0044266 A1* | 2/2005 | O'Neil | G06F 3/023 709/238 |
| 2005/0216620 A1 | 9/2005 | Sandulescu et al. | |
| 2005/0231462 A1* | 10/2005 | Chen | G06F 3/023 345/156 |
| 2005/0235079 A1 | 10/2005 | Chen | |
| 2007/0247430 A1 | 10/2007 | Huang | |
| 2009/0031049 A1* | 1/2009 | Lien | G06F 3/023 710/6 |
| 2009/0083453 A1 | 3/2009 | Hsueh et al. | |
| 2009/0157922 A1* | 6/2009 | Lin | G06F 3/14 710/72 |
| 2009/0204742 A1 | 8/2009 | Wiler | |
| 2010/0023660 A1 | 1/2010 | Liu | |
| 2010/0228884 A1* | 9/2010 | Sim | G09G 5/006 710/4 |
| 2011/0060849 A1* | 3/2011 | Lin | G06F 3/023 710/15 |
| 2011/0145451 A1 | 6/2011 | Soffer et al. | |
| 2011/0208963 A1 | 8/2011 | Soffer | |
| 2011/0225329 A1* | 9/2011 | Charna | G06F 1/3203 710/62 |
| 2012/0159651 A1* | 6/2012 | Beacham | G06F 3/023 726/34 |
| 2013/0050084 A1* | 2/2013 | Soffer | G06F 3/023 345/163 |
| 2013/0067534 A1 | 3/2013 | Soffer | |
| 2014/0019652 A1* | 1/2014 | Soffer | G06F 21/83 710/73 |
| 2014/0172422 A1 | 6/2014 | Hefetz | |
| 2014/0244880 A1 | 8/2014 | Soffer | |
| 2014/0289433 A1 | 9/2014 | Soffer et al. | |
| 2015/0215570 A1* | 7/2015 | Leibow | G06F 3/1454 386/231 |
| 2015/0356045 A1* | 12/2015 | Soffer | G06F 13/4221 710/303 |
| 2015/0365237 A1 | 12/2015 | Soffer | |
| 2016/0147691 A1* | 5/2016 | Huang | G06F 3/0227 710/65 |
| 2018/0097629 A1 | 4/2018 | Soffer | |
| 2018/0189197 A1 | 7/2018 | Lin et al. | |
| 2018/0299969 A1* | 10/2018 | Liang | G06F 3/023 |
| 2019/0278724 A1* | 9/2019 | Lin | G06F 3/023 |

FOREIGN PATENT DOCUMENTS

| | | | | |
|---|---|---|---|---|
| EP | 2476076 B1 * | 4/2015 | | G06F 3/023 |
| EP | 3318960 A1 * | 5/2018 | | G06F 3/038 |
| TW | 201407356 A | 2/2014 | | |
| WO | WO-2005008409 A2 * | 1/2005 | | G06F 3/023 |
| WO | WO-2011030126 A1 * | 3/2011 | | G06F 3/023 |
| WO | WO-2011104715 A2 * | 9/2011 | | G06F 3/023 |
| WO | 2011104715 A3 | 1/2012 | | |

OTHER PUBLICATIONS

'K2016E-SH-16-Port DVI Secure EAL4+ KVM Switch with CAC & Audio' from KVM-switches-online, archived on Sep. 26, 2016. (Year: 2016).*

'Be the Puppet Master! Control Multiple PCs with one Keyboard and Mouse' by Wesley David, May 20, 2011. (Year: 2011).*

* cited by examiner

KEYBOARD-VIDEO-MOUSE SWITCH, AND SIGNAL TRANSMITTING METHOD

CROSS-REFERENCE TO RELATED APPLICATION

This application is a continuation-in-part of U.S. application Ser. No. 15/726,794, filed on Oct. 6, 2017, which claims priority to U.S. Provisional Application Ser. No. 62/406,498, filed on Oct. 11, 2016, and U.S. Provisional Application Ser. No. 62/429,167, filed on Dec. 2, 2016 the full disclosure of which is incorporated herein by reference.

FIELD OF INVENTION

The invention relates to a keyboard-video-mouse switch, and a signal transmitting method. More particularly, the invention relates to a keyboard-video-mouse switch, and a signal transmitting method for transmitting a serial signal with address.

BACKGROUND

The switching system (for example, a Keyboard-Video-Mouse (KVM) system) is used for interconnecting a single human interface device to multiple computers for control purposes. The KVM switch may control a human interface device to send commands to one of the computers and retrieve information therefrom, thus a user of the human interface device may remotely access to these computers from a single keyboard, a monitor, and a mouse. During accessing these computers, typing on keyboard or pointing with mouse may generate data correspondingly, and the data are sent to one of the computers via the switch. In the other end, the computer may send video data to a video monitor via the switch as well. In general, the user may navigate through an on-screen menu or display to switch between these connected computers.

The approach provides enables the user to acquire information from different computers simultaneously, and makes navigation between the computers more convenient and faster. However, said prior arts do not concern about transmitting the keyboard signal and the mouse signal to the different computers. For the future applications, it is desirable to have a management device which may control multiple computers in a simple way but meanwhile transmit the keyboard signal and the mouse signal to the different computers.

SUMMARY

An embodiment of this disclosure is to provide a KVM switch, for connecting between a plurality of computers and at least one peripheral device, the KVM switch includes at least one first interface, a plurality of second interfaces, a controller and a plurality of device emulators. The at least one first interface configured to connect to the at least one peripheral device. The controller connected to the at least one peripheral device through the at least one first interface, configured to receive a peripheral signal through the at least one first interface and generate a first serial signal and a second serial signal, he first serial signal comprising a first target address and data of the peripheral signal, the second serial signal comprising a second target address and the data of the peripheral signal. The plurality of device emulators, connected to the computers through the second interfaces, each of the of device emulators being configured to receive the first serial signal with the first target address and the second serial signal with the second target address, and each of the device emulators is guided by unique address to one of the computers, respectively, wherein, when the device emulators receive the first serial signal and the second serial signal, the device emulators are configured to determine whether to process the first serial signal and the second serial signal by comparing the first target address and the second target address with the unique address.

An embodiment of this disclosure is to provide a signal transmitting method for a KVM switch, the signal transmitting method includes the following operations: receiving at least one peripheral signal through at least one first interface; generating a first serial signal and a second serial signal, the first serial signal comprising a first target address and data of the peripheral signal, the second serial signal comprising a second target address and the data of the peripheral signal; sending the first serial signal and the second serial signal to a plurality of device emulators; determining whether to process the first serial signal and the second serial signal by the device emulators; wherein, each of the device emulators is guided by unique address to one of the computers, respectively.

The present disclosure is to provide a keyboard-video-mouse switch, and a signal transmitting method. The disclosure mainly utilizes the controller to transmit a serial signal according to the at least one peripheral signal and the device emulators are configured to determine whether to receive the serial signal by comparing the address. Therefore, the disclosure can achieve the effect of transmitting the serial signal to a specific computer in KVM switch system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
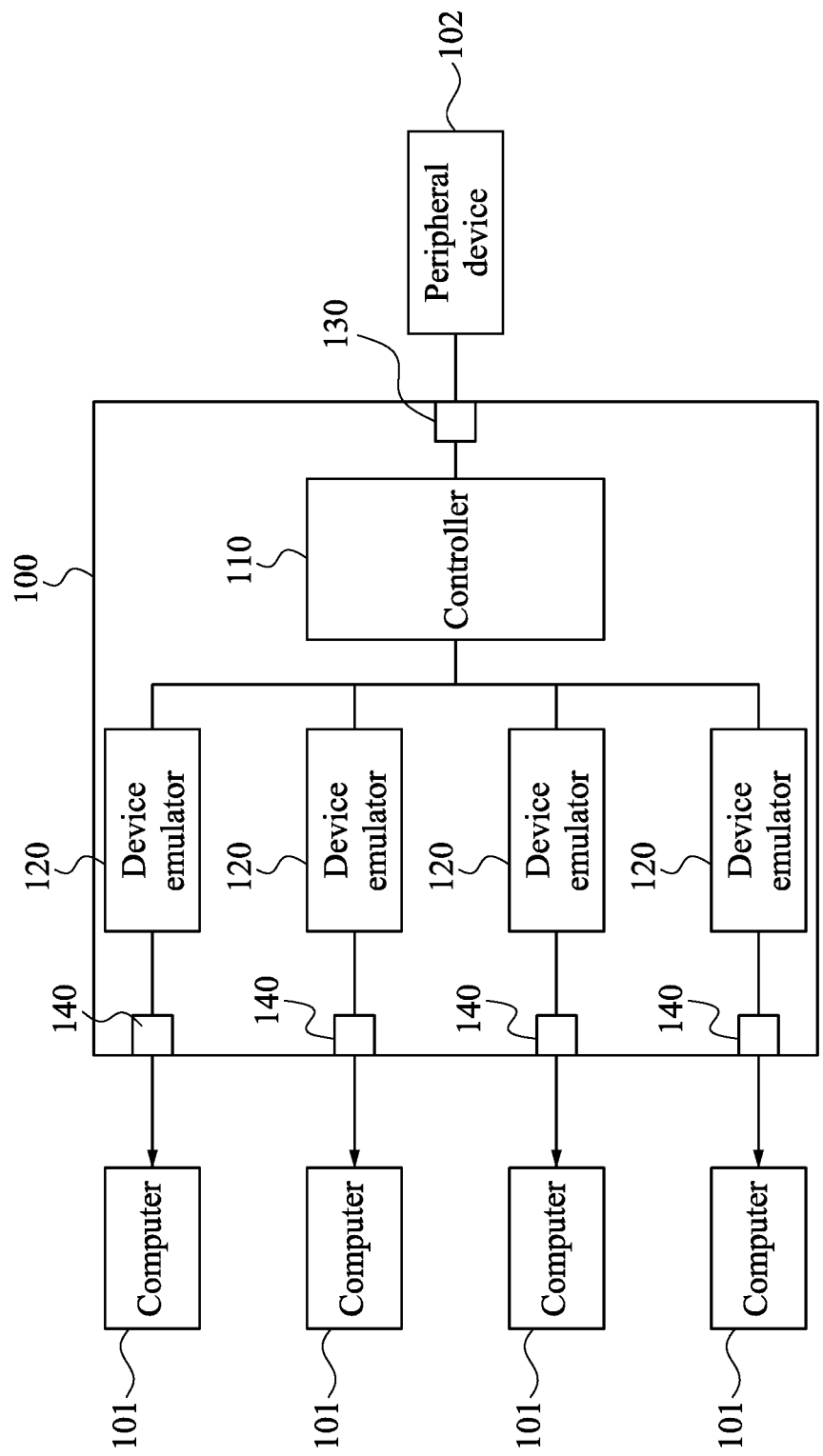
FIG. 1 is a functional block diagram illustrating a KVM switch according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a KVM switch 100 according to some embodiments of the present disclosure. As illustrated in FIG. 1, the KVM switch 100 is connected between a plurality of computers 101 and a peripheral device 102. The KVM switch 100 includes a controller 110, a plurality of device emulators 120, a first interface 130, and a plurality of second interfaces 140. In some embodiments, the connection between the KVM switch 100, the computers 101 and the peripheral device 102 may be wire connection or wireless connection. The KVM switch 100 shown in FIG. 1 is for illustrative purposes only and the present disclosure is not limited thereto.

In some embodiments, the controller 110 is electrically coupled to the device emulators 120 and the first interface 130. The device emulators 120 are electrically coupled to the second interfaces 140. The first interface 130 is electrically coupled to the peripheral device 102. The second interfaces are electrically coupled to the computers 101. The controller 110 is configured to receive a peripheral signal through the first interface 130 and generate a first serial signal and a second serial signal, the first serial signal comprising a first target address and data of the peripheral signal, the second serial signal comprising a second target address and the data of the peripheral. The device emulators 120 are configured to receive the first serial signal with the first target address and the second serial signal with the second target address, and each of the device emulators 120 is guided by unique address to one of the computers 101, respectively, wherein, when the device emulators 120 receive the first serial signal and the second serial signal, the device emulators 120 are configured to determine whether to process the first serial signal and the second serial signal by comparing the first target address and the second target address with the unique address.

In some embodiments, the peripheral device 102 can be implemented by a keyboard or a mouse. The controller 110 can be implemented by a micro controller, a microprocessor, a digital signal processor, an application specific integrated circuit (ASIC), a logical circuitry or any equivalent circuits of the secure controller 110. The device emulators 120 are configured to emulate as a standard peripheral device, such as USB, keyboard or mouse.

Figure 2:
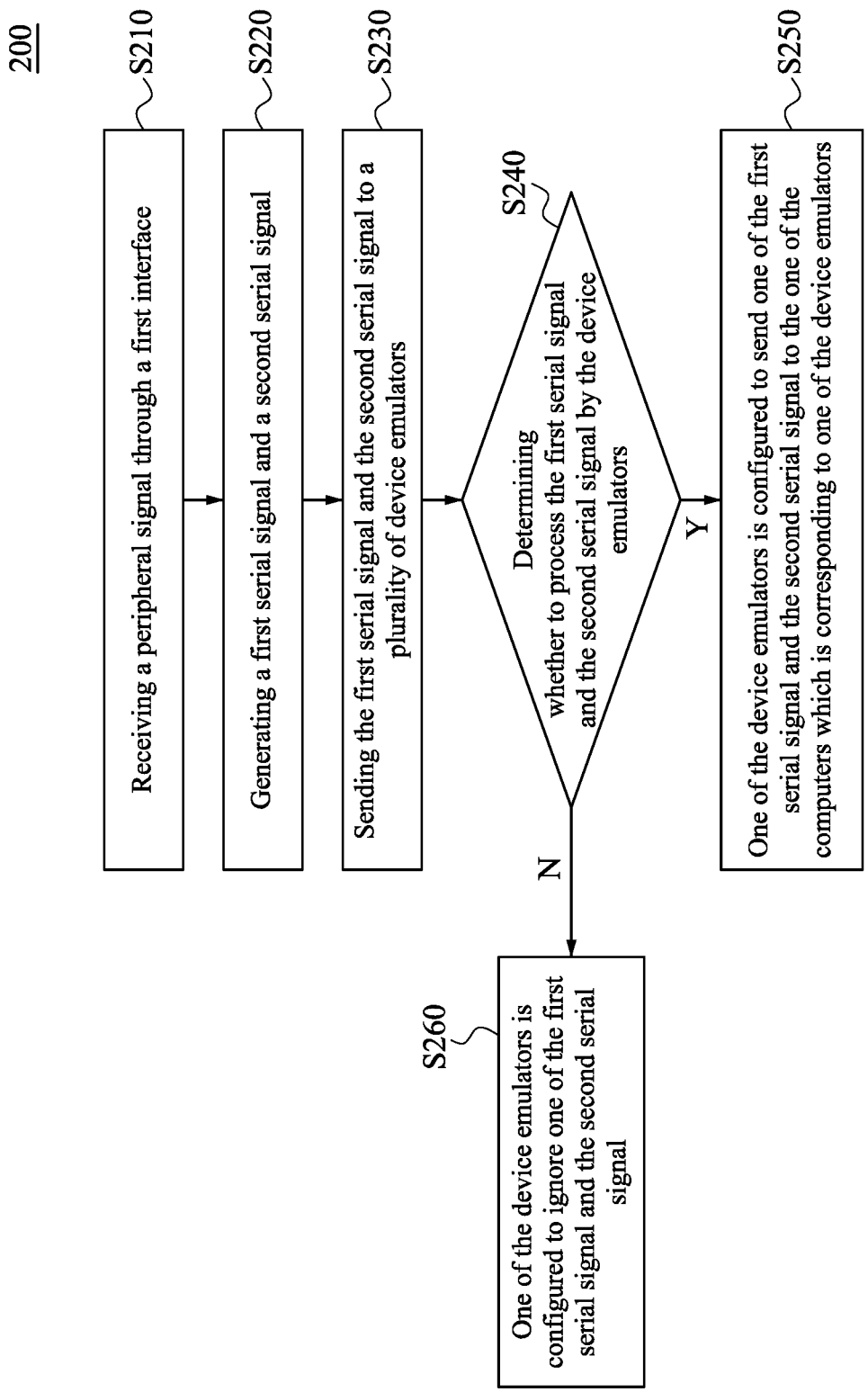
FIG. 2 is a flow diagram illustrating a signal transmitting method according to an embodiment of this disclosure.

Reference is made to FIG. 2. FIG. 2 is a flow diagram illustrating a signal transmitting method 200 according to an embodiment of this disclosure. In the embodiment, the signal transmitting method 200 can be utilized transmit signal with address to device emulators 120. The device emulators 120 are configured to determine whether to process the first signal with the first target address and the second serial signal with the second target address. For convenience of explanation and understanding, reference is made to both FIG. 1 and FIG. 2.

As the embodiment shown in FIG. 2, the signal transmitting method 200 firstly executes step S210 to receive a peripheral signal through a first interface 130. In the embodiment, the peripheral device 102 is configured to send the peripheral signal to the controller 110 through the first interface 130. The peripheral signal can be implemented by data of a mouse or a keyboard.

Afterward, the signal transmitting method 200 executes step S220 and step S230 to generate a first serial signal and a second serial signal and to send the first serial signal and the second serial signal to a plurality of device emulators 120. In the embodiment, the controller 110 is configured to generate the first serial signal with first target address and data of the peripheral signal and the second serial signal with second target address and the data of the peripheral signal. The controller 110 is configured to send the first serial signal and the second serial signal to the device emulators 120. The controller 110 is further configured to send the first serial signal with the first target address and data of the peripheral signal in a clock interval, and to send the second serial signal with the second target address and data of the peripheral signal in another clock interval. For example, when the controller 110 receives the peripheral signal form the mouse, the controller 110 generates the first serial signal with the mouse data and the first target address, afterward, the controller 110 sends the first serial signal to the device emulators 120 in a clock interval. The controller 110 is able to duplicate the mouse data and generates the second serial signal with the same mouse data and the second target address, afterward, the controller 110 sends the second serial signal to the device emulators 120 in another clock interval.

Afterward, the signal transmitting method 200 executes step S240 to determine whether to process the first serial signal and the second serial signal by the device emulators 120. Based on aforesaid embodiments, each of the device emulators 120 is guided by unique address to one of the computers 101, respectively. When the first serial signal and the second serial signal are broadcasted to the device emulators 120, the device emulators 120 may authenticate the first target address in the first serial signal and the second target address in the second serial signal. The each of the device emulators 120 compares the first target address and the second target address with the unique address.

If the step S240 the unique address of one of the device emulators 120 matches one of the first target address and the second target address, the signal transmitting method 200 executes step S250 to send one of the first serial signal and the second serial signal to the one of the computers 101 which is corresponding to one of the device emulators 120. If the step S240 the unique address of one of the device emulators 120 does not match one of the first target address and the second target address, the signal transmitting method 200 executes step S260 to ignore one of the first serial signal and the second serial signal.

Figure 3:
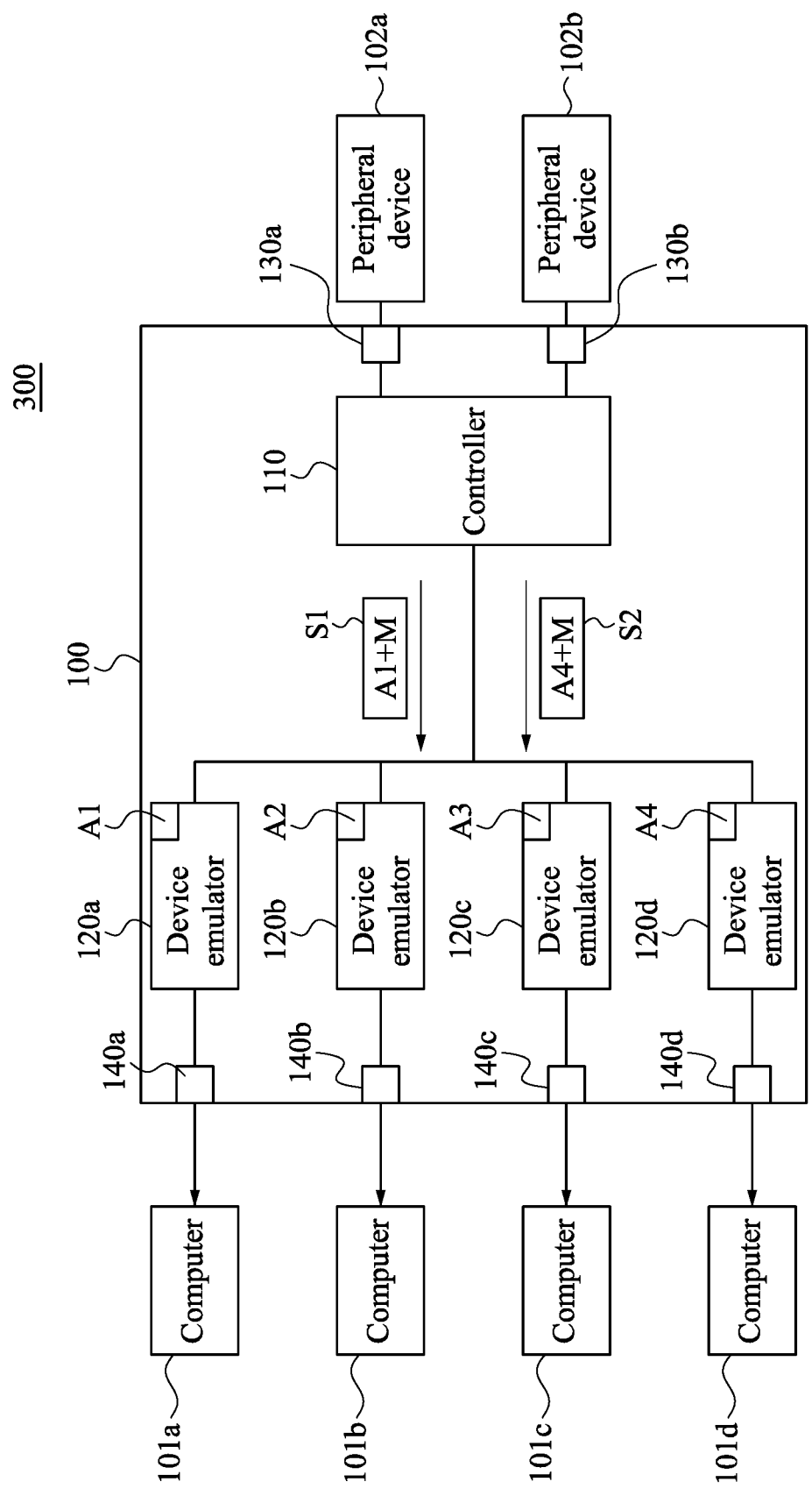
FIG. 3 is a functional block diagram illustrating a KVM switch according to some embodiments of the present disclosure.

For convenience of explanation and understanding, reference is made to FIG. 3. FIG. 3 is a schematic diagram illustrating a KVM switch 300 according to some embodiments of the present disclosure. As shown in FIG. 3, the KVM switch 300 includes a plurality of computers 101a, 101b, 101c and 101d, a plurality of peripheral devices 102a and 102b, a controller 110, a plurality of device emulators 120a, 120b, 120c and 120d, a plurality of first interfaces 130a and 130b, and a plurality of second interfaces 140a, 140b, 140c and 140d. The peripheral devices 102a and 102b can be implemented by data of a mouse and a keyboard. In the embodiments, the peripheral devices 102a is configured to send a peripheral signal with the mouse data to the controller 110 via the first interface 130a, and the peripheral devices 102b is configured to send a peripheral signal with the keyboard data to the controller 110 via first interface 130b.

Based on aforesaid embodiments, when the controller 110 receives the peripheral signals with the mouse data M and the keyboard data K, the controller 110 is configured to generate serial signals S1 and S2 with address according to the peripheral signals with the mouse data M and the keyboard data K. For example, the controller 110 is configured to generate the serial signal S1 with the mouse data M and address A1 and the serial signal S2 with the keyboard data K and address A4. The controller 110 is configured to send the serial signal S1 to the device emulators 120a, 120b, 120c and 120d in a clock interval and send the serial signal S2 to the device emulators 120a, 120b, 120c and 120d in another clock interval.

Based on aforesaid embodiments, when the device emulators 120a, 120b, 120c and 120d receive the serial signal S1, each of the device emulators 120a, 120b, 120c and 120d has is guided by unique address to one of the computers 101a, 101b, 101c and 101d, respectively and each of the device emulators 120a, 120b, 120c and 120d is configured to determine whether to process the serial signal S1 by comparing the address A1 with the unique address. In this embodiment, the unique address of the device emulators 120a matches the address A1, the device emulators 120a is configured to send the serial signal S1 with the mouse data M and address A1 to the computer 101a via the second interface 140a. The unique address of the device emulators 120b, 120c and 120d do not match the address A1, the device emulators 120b, 120c and 120d ignore the serial signal S1.

Based on aforesaid embodiments, when the device emulators 120a, 120b, 120c and 120d receive the serial signal S2, because the serial signal S2 with the keyboard data K and address A4, the unique address of the device emulator 120d matches the address A4 and the device emulator 120d is configured to send the serial signal S2 with the keyboard data K and address A4 to the computer 101d via the second interface 140d, the device emulators 120a, 120b and 120c ignore the serial signal S2. Therefore, the controller 110 is able to send the serial signals S1 and S2 to the different computer with different addresses.

Figure 4:
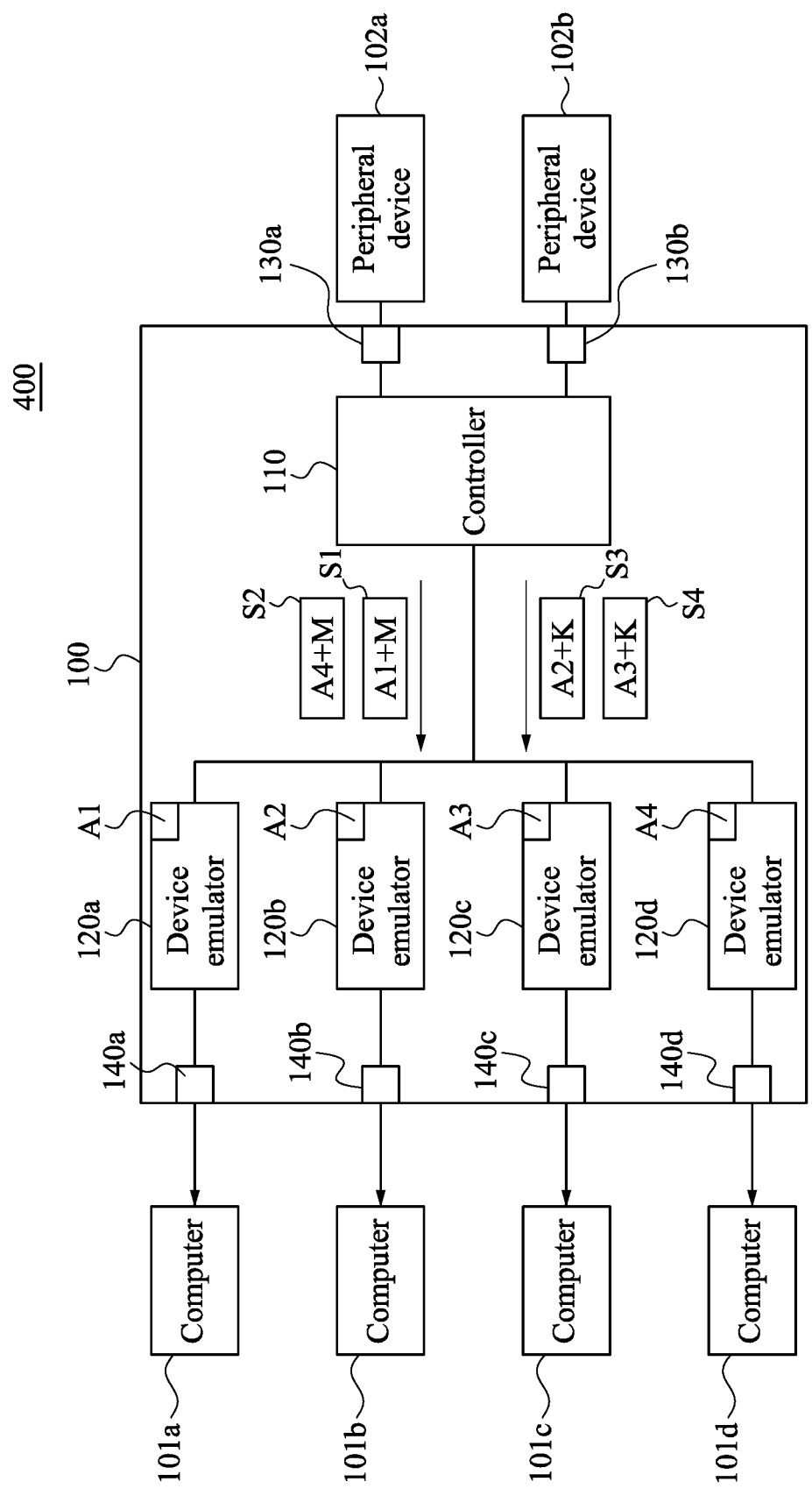
FIG. 4 is a functional block diagram illustrating a KVM switch according to some embodiments of the present disclosure.

Reference is made to FIG. 4. FIG. 4 is a functional block diagram illustrating a KVM switch 400 according to some embodiments of the present disclosure. As shown in FIG. 4, the KVM switch 400 includes a plurality of computers 101a, 101b, 101c and 101d, a plurality of peripheral devices 102a and 102b, a controller 110, a plurality of device emulators 120a, 120b, 120c and 120d, a plurality of first interfaces 130a and 130b, and a plurality of second interfaces 140a, 140b, 140c and 140d. The peripheral devices 102a and 102b can be implemented by data of a mouse and a keyboard, and is configured to send the peripheral signals with the mouse data and the keyboard data. In the embodiments, the controller 110 is configured to generate the serial signal S1 with the mouse data M and address A1 and the serial signal S2 with the mouse data M and address A4. The controller 110 is configured to send the serial signals S1 and S2 with the same mouse data M and different addresses A1 and A4 to the device emulators 120a, 120b, 120c and 120d.

In other words, the controller 110 is able to duplicate the mouse data M, and attach different addresses A1 and A4 to the mouse data M. The serial signal S1 and the serial signal S2 carry the same mouse data M and are directed to different targets. The device emulator 120a and the device emulator 120d will receive the same mouse data M according to the addresses A1 and A4 attached on the serial signal S1 and the serial signal S2. In the embodiment, the device emulator 120b and the device emulator 120c will ignore the serial signal S1 and the serial signal S2, because the addresses (e.g., A1 and A4) attached in the serial signals S1 and S2 are not matched to the unique addresses (e.g., A2 and A3) of the device emulators 120b and 120c.

In aforesaid embodiment, the controller 110 is configured to send the serial signals S3 and S4 with the same keyboard data K and different addresses A2 and A3 to the device emulators 120a, 120b, 120c and 120d. In other words, the controller 110 is able to duplicate the keyboard data K, and attach different addresses A2 and A3 to the keyboard data K. The serial signal S3 and the serial signal S4 carry the same keyboard data K and are directed to different targets. The device emulator 120b and the device emulator 120c will receive the same keyboard data K according to the addresses A2 and A3 attached on the serial signal S3 and the serial signal S4. In the embodiment, the device emulator 120a and the device emulator 120b will ignore the serial signal S3 and the serial signal S4, because the addresses (e.g., A2 and A3) attached in the serial signals S3 and S4 are not matched to the unique addresses (e.g., A1 and A4) of the device emulators 120a and 120d.

In this embodiment, the operating flow of the device emulators 120a, 120b, 120c and 120d are same as aforesaid device emulators 120a, 120b, 120c and 120d and not to be further discussed here.

According to the embodiment of the present disclosure, it is understood that the embodiment of the present disclosure is to provide a keyboard-video-mouse switch, and a signal transmitting method; in order to transmit serial signals according to peripheral signals and the device emulators are configured to determine whether to receive the serial signals by comparing the address. Therefore, the disclosure can achieve the effect of transmitting serial signals to a specific computer in KVM switch system.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A keyboard-video-mouse (KVM) switch, for connecting between a plurality of computers and at least one peripheral device, the KVM switch comprising:
   at least one first interface configured to connect to the at least one peripheral device;
   a plurality of second interfaces configured to connect to the computers;
   a controller connected to the at least one peripheral device through the at least one first interface, configured to receive a peripheral signal generated by the at least one peripheral device through the at least one first interface and generate a first serial signal and a second serial signal according to the peripheral signal, the first serial signal comprising a first target address and a first data of the peripheral signal, wherein the controller duplicates the first data of the peripheral signal generated by the at least one peripheral device and generates the second serial signal with the first data and a second target address;
   a plurality of device emulators, connected to the computers through the second interfaces, each of the device emulators being configured to receive the first serial signal with the first target address and the second serial signal with the second target address, and each of the device emulators is guided by unique address to one of the computers, respectively;
   wherein, when the device emulators receive the first serial signal and the second serial signal, the device emulators are configured to determine whether to process the first serial signal and the second serial signal by comparing the first target address and the second target address with the unique address.

2. The KVM switch of claim 1, wherein the device emulators are configured to determine whether to process the first serial signal and the second serial signal by comparing the first target address and the second target address with the unique address, if the unique address of one of the device emulators matches one of the first target address and the second target address, one of the device emulators is configured to send one of the first serial signal and the second serial signal to the one of the computers which is corresponding to one of the device emulators.

3. The KVM switch of claim 2, wherein if the unique address of one of the device emulators does not match the first target address and the second target address, one of the device emulators is configured to ignore one of the first serial signal and the second serial signal.

4. The KVM switch of claim 1, wherein the device emulators further comprising:
   a first device emulator, connected to a first computer of the computers, and the first device emulator is guided by a first unique address;
   a second device emulator, connected to a second computer of the computers, and the second device emulator is guided by a second unique address;
   a third device emulator, connected to a third computer of the computers, and the third device emulator is guided by a third unique address; and
   a fourth device emulator, connected to a fourth computer of the computers, and the fourth device emulator is guided by a fourth unique address.

5. The KVM switch of claim 1, wherein the controller is further configured to send the first serial signal with the first target address and the first data of the peripheral signal in a clock interval, and to send the second serial signal with the second target address and the first data of the peripheral signal in another clock interval.

6. The KVM switch of claim 1, wherein the at least one peripheral device comprises a mouse or a keyboard.

7. A signal transmitting method for a KVM switch, the signal transmitting method comprising:
   receiving, by a controller, at least one peripheral signal generated by at least one peripheral device through at least one first interface;
   generating, by the controller, a first serial signal and a second serial signal according to the peripheral signal, the first serial signal comprising a first target address and a first data of the peripheral signal, wherein the first data of the peripheral signal generated by the at least one peripheral device is duplicated by the controller to generate the second serial signal with the first data and a second target address;
   sending, by the controller, the first serial signal and the second serial signal to a plurality of device emulators; and
   determining whether to process the first serial signal and the second serial signal by the device emulators;
   wherein, each of the device emulators is guided by unique address to one of the computers, respectively.

8. The signal transmitting method of claim 7, wherein determining whether to process the first serial signal and the second serial signal by the device emulators comprises:
   determining whether to process the first serial signal and the second serial signal by comparing the first target address and the second target address with the unique address; and
   if the unique address of one of the device emulators matches one of the first target address and the second target address, one of the device emulators is configured to send one of the first serial signal and the second serial signal to the one of the computers which is corresponding to one of the device emulators.

9. The signal transmitting method of claim 8, wherein determining whether to process the first serial signal and the second serial signal by comparing the address with the unique address further comprises:
   if the unique address of one of the device emulators does not match one of the first target address and the second target address, one of the device emulators is configured to ignore one of the first serial signal and the second serial signal.

10. The signal transmitting method of claim 7, wherein the controller is further configured to send the first serial signal with the first target address and the first data of the peripheral signal in a clock interval, and to send the second serial signal with the second target address and the first data of the peripheral signal in another clock interval.

11. A keyboard-video-mouse (KVM) switch, for connecting between a plurality of computers and a plurality of peripheral devices, the KVM switch comprising:
   a plurality of first interfaces configured to connect to the peripheral devices;
   a plurality of second interfaces configured to connect to the computers;
   a controller connected to the peripheral devices through the first interfaces, configured to receive a plurality of peripheral signals generated by the peripheral devices through the first interfaces and generate a first serial signal, a second serial signal and a third serial signal, the first serial signal comprising a first target address and a first data of one of the peripheral signals, and the second serial signal comprising a second target address and a second data of one of the peripheral signals, wherein the controller duplicates the second data and generates the third serial signal with the second data and a third target address;

a plurality of device emulators, connected to the computers through the second interfaces, each of the device emulators being configured to receive the first serial signal with the first target address, the second serial signal with the second target address and the third serial signal with the third target address, and each of the device emulators is guided by unique address to one of the computers, respectively;

wherein, when the device emulators receive the first serial signal, the second serial signal and the third serial signal, the device emulators are configured to determine whether to process the first serial signal, the second serial signal and the third serial signal by comparing the first target address, the second target address and the third address with the unique address.

* * * * *